US012397578B2

(12) United States Patent
Stewart et al.

(10) Patent No.: US 12,397,578 B2
(45) Date of Patent: Aug. 26, 2025

(54) MAGNETIC CONNECTOR

(71) Applicant: Wingbinder Limited, Oxford (GB)

(72) Inventors: Alexander Malcom Shaw Stewart, Oxford (GB); Andrew James Last, Oxford (GB); Duncan Crosse, Oxford (GB)

(73) Assignee: Wingbinder Limited, Oxford (GB)

(*) Notice: Subject to any disclaimer, the term of this patent is extended or adjusted under 35 U.S.C. 154(b) by 405 days.

(21) Appl. No.: 18/007,099

(22) PCT Filed: Jul. 27, 2021

(86) PCT No.: PCT/GB2021/051925
§ 371 (c)(1),
(2) Date: Jan. 27, 2023

(87) PCT Pub. No.: WO2022/023726
PCT Pub. Date: Feb. 3, 2022

(65) Prior Publication Data

US 2023/0279881 A1 Sep. 7, 2023

(30) Foreign Application Priority Data

Jul. 30, 2020 (GB) ..................................... 2011875

(51) Int. Cl.
*B42F 7/14* (2006.01)
*B42F 13/00* (2006.01)
*B42F 13/16* (2006.01)

(52) U.S. Cl.
CPC .............. *B42F 7/14* (2013.01); *B42F 13/002* (2013.01); *B42F 13/0026* (2013.01); *B42F 13/16* (2013.01)

(58) Field of Classification Search
CPC ................................ B42F 13/002; B42F 7/14
See application file for complete search history.

(56) References Cited

U.S. PATENT DOCUMENTS

2005/0194382 A1* 9/2005 B. ...................... B65D 11/1833 220/7
2009/0261093 A1* 10/2009 Fullerton ............... B25H 3/021 220/4.28

(Continued)

FOREIGN PATENT DOCUMENTS

DE 102013207240 A1 10/2014
EP 3505362 A2 7/2019

(Continued)

OTHER PUBLICATIONS

International Search Report and Written Opinion for PCT Application No. PCT/GB2021/051925 mailed on Oct. 22, 2021 (13 pgs).

(Continued)

*Primary Examiner* — Don M Anderson
(74) *Attorney, Agent, or Firm* — Finch & Maloney PLLC

(57) ABSTRACT

A magnetic connector comprising a male part and a female part, in which said male part comprises a first side and a second side extending from said first side at an oblique angle thereto, in which said male part comprises a first metal portion comprising a first metal surface on said second side, in which said second side comprises a protrusion proud of said first metal surface, in which said female part comprises a third side and a fourth side extending from said third side at an oblique angle thereto, in which said female part comprises a second metal portion comprising a second metal surface on said fourth side, in which said fourth side comprises a slot for receiving said protrusion, in which at least one of said first metal portion and said second metal portion is magnetic and attracts the other.

12 Claims, 7 Drawing Sheets

(56) References Cited

U.S. PATENT DOCUMENTS

| | | | | |
|---|---|---|---|---|
| 2017/0325582 | A1* | 11/2017 | Mort | F16B 12/12 |
| 2018/0222625 | A1* | 8/2018 | Perella | B65D 9/14 |
| 2018/0258965 | A1* | 9/2018 | Danko | F16B 1/00 |
| 2018/0339837 | A1* | 11/2018 | Fitt | B65D 11/1866 |
| 2019/0107134 | A1* | 4/2019 | Di Quadri | F16B 12/28 |
| 2019/0176508 | A1* | 6/2019 | Song | B42F 13/16 |
| 2022/0013267 | A1* | 1/2022 | Kuo | A63H 33/008 |

FOREIGN PATENT DOCUMENTS

| | | | |
|---|---|---|---|
| FR | 2834485 | A1 | 7/2003 |
| GB | 2567447 | A | 4/2019 |

OTHER PUBLICATIONS

Combined Search and Examination Report for GB Application No. GB2011875.8 Date of Report: Jan. 20, 2021 (4 pgs.).

* cited by examiner

MAGNETIC CONNECTOR

CROSS-REFERENCE TO RELATED APPLICATIONS

This application claims priority under 35 U.S.C. § 371 as a national stage application of PCT Application No. PCT/GB2021/051925, filed Jul. 27, 2021, which claims priority to GB 2011875.8, filed Jul. 30, 2020, each of which is hereby incorporated herein by reference in its entirety.

The present invention relates to a magnetic connector, for use particularly, but not exclusively, to releasably connect the walls of a box file.

Ring binder files and the like are well-known and comprise a set of rings or arches for supporting sheets of paper with punched holes. They comprise a spine and rear and front walls which are freely rotatable relative to the spine. A particular advantage of this arrangement is that the ring binder can be opened up and laid flat, allowing a user easy access to the papers therein. However, a problem with such ring binders is that because they only comprise a spine, a rear wall and a front wall any loose sheets of paper placed therein can drop out. In addition, the sheets of paper in the rings or arches can also be damaged if the file falls open inadvertently. Furthermore, such binders have a triangular cross-sectional shape when the height of paper sheets therein is less than the width of the spine, which means they are awkward to store, either in a pile or next to one another on a shelf.

Box files address some of the above problems. These comprise a box with a front wall which is freely rotatable relative to the spine thereof. Box files can be provided with a set of rings or arches for supporting sheets of paper with punched holes, or they can be provided with a spring loaded retention lever to simply hold loose sheets of paper inside the box. Advantages of box files are that the paper therein is better protected and cannot fall out. Also, box files are easy to store, either in a pile or next to one another on a shelf. However, a particular disadvantage of most box files is that they cannot be laid flat allowing a user easy access to the papers therein, for instance to work directly on them.

DE29816556 to Reygers Goltzen Alexander et al, addresses the above problems by providing a box file comprising a front wall, a rear wall, a top wall, a bottom wall, a left wall and a right wall, in which freely rotating hinges are provided along edges of the box between the rear wall and each of the top wall, bottom wall, left wall and right wall, and between the top wall and the left wall. As such, it can be opened up and laid flat for easy access. Similar designs are shown in DE102013207240 to Herlitz PBS AG, DE19643213 to Scharrenberg, DE339560 to Heini Holland, U.S. Pat. No. 4,515,493 to Radovich, GB2232639 to Sterling Marking Prod, and FR2762546 to Columbia Finances.

However, all of the above referenced prior art suffers from the same problem, which is relatively weak releasable connectors at the corners between the folding walls, namely between the bottom wall and the left wall, between the left wall and the top wall, between the top wall and the right wall and between the right wall and the bottom wall. In particular, in the prior art simple fixings like hook and loop fasteners, or metal poppers are used. These may be strong enough to keep the box closed, but they do not contribute to its structural integrity. In particular, any inbound forces applied to the walls can result in movement. Further any sheer forces experienced at the corners between adjacent perpendicular walls can lead to them moving in relation to one another.

The present invention is intended to overcome some of the above described problems, and to provide a new and advantageous magnetic connector which can be used to support any two items at an angle to one another.

Therefore, according to a first aspect of the present invention a magnetic connector comprises a male part and a female part, in which said male part comprises a first side and a second side extending from said first side at an oblique angle thereto, in which said male part comprises a first metal portion comprising a first metal surface on said second side, in which said second side comprises a protrusion proud of said first metal surface, in which said female part comprises a third side and a fourth side extending from said third side at an oblique angle thereto, in which said female part comprises a second metal portion comprising a second metal surface on said fourth side, in which said fourth side comprises a slot for receiving said protrusion, in which at least one of said first metal portion and said second metal portion is magnetic and attracts the other.

Thus, the present invention provides a connector in which the male part and the female part are releasably magnetically connected together at an angle. Further, the locating of the protrusion in the slot prevents any sheering movement between the first metal surface and the second metal surface. As explained in greater detail below, if a magnetic connector like this is applied to something like a box file it can provide an advantageously strong connection between adjacent side walls thereof.

As mentioned above, either the first metal portion or the second metal portion can be magnetic, but preferably both the first metal portion and the second metal portion can be magnetic and can be attracted to one another.

An internal angle between the first side and the second side, and an internal angle between the third side and the fourth side can be any size, such that the angular relationship between the first side and the third side when the male part and the female part are connected can be any angle (including 0 degrees if both oblique internal angles add up to 180 degrees). However, preferably an internal angle between the first side and the second side can be substantially 45 degrees, and an internal angle between the third side and the fourth side can be substantially 45 degrees, such that when the first metal surface and the second metal surface contact one another the first side and the third side are at substantially 90 degrees to one another.

The protrusion and the slot can be any co-operating shapes, such as a simple boss and socket. However, in a preferred construction the second side can have a rectangular shape with a greater length than width, and the protrusion can comprise an elongate wall extending in a lengthwise direction of the second side substantially equidistant from opposite lengthwise sides thereof and intersecting the first metal surface. Likewise, the fourth side can have a rectangular shape with a greater length than width, and the slot can comprise an elongate trough extending in a lengthwise direction of the fourth side substantially equidistant from opposite lengthwise sides thereof and intersecting the second metal surface. The purpose of this elongate shape of wall and trough is to provide the maximum resistance to inbound sheer forces between the second side and the fourth side (inbound meaning directed into the 90 degree internal angle between the male part and the female part). The lengthwise extent of the wall and trough mean that such inbound sheer forces are resisted along a length of the connection between the male part and the female part.

The wall and the trough can have any co-operating axial cross-sectional shapes, such as a square or a round shape.

However, in a preferred construction the wall can comprise a top surface at 45 degrees to the first metal surface, and the trough can comprise a bottom surface at 45 degrees to the second metal surface. This means that the wall and trough are triangular relative to the first metal surface and second metal surface respectively. This facilitates easy location and removal of the wall from the trough, but is also a result of the frame construction explained below.

The first metal portion and the second metal portion can simply be made entirely from a magnetic material, however this adds weight as well as undesirable additional manufacturing costs. It is preferred to utilise a readily available tile-shaped magnet sandwiched between ferromagnetic metal plates. Namely, the first metal portion can comprise a first magnet, a first ferromagnetic metal plate and a second ferromagnetic metal plate. The first magnet can be any shape with opposite faces to which the first metal plate and the second metal plate can be connected. However, preferably the first magnet is tile-shaped and can comprise a first face, a second face and a first edge surface. The term "tile shaped" as used herein includes any thin, low-profile or flattened shape including a cylinder, disk, triangular prism, hexagonal prism, cuboid or rectangular prism. The first magnet can comprise a north pole at the first face and a south pole at the second face, the first metal plate can be magnetically connected to the first face and the second metal plate can be magnetically connected to the second face. The first metal plate and the second metal plate can be located with outer ends thereof proud of the first edge surface in a first direction, and the outer ends of the first metal plate and the second metal plate can combine to form the first metal surface. Likewise, the second metal portion can comprise a second magnet, a third ferromagnetic metal plate and a fourth ferromagnetic metal plate. The second magnet can also be any shape with opposite faces to which the third metal plate and the fourth metal plate can be connected. However, preferably the second magnet can be tile-shaped and can comprise a third face, a fourth face and a second edge surface. The second magnet can comprise a south pole at the third face and a north pole at the fourth face. The third metal plate can then be magnetically connected to the third face and the fourth metal plate can be magnetically connected to the fourth face. The third metal plate and the fourth metal plate can be located with outer ends thereof proud of the second edge surface in a second direction, and the outer ends of the third metal plate and the fourth metal plate can combine to form the second metal surface.

The term "outer" used herein means proximal of the second side and fourth side respectively of the male part and the female part, and the relative term "inner" means distal thereof. As such, the "first direction" is along an axis extending from an inner end of the male part to an outer end thereof, and the "second direction" is along an axis extending from an inner end of the female part to an outer end thereof. When the male part and the female part are connected to one another the first direction and the second direction are at 90 degrees to one another. However, the term "internal" used herein means proximal the internal 90 degree angle between the male part and the female part, and the relative term "external" means distal thereof. Therefore, an internal side of a component is that facing into the 90 degree angle (facing the inside of a box file), and an external side is that facing outward thereof (facing outside of a box file).

With this sandwich magnet arrangement the ferromagnetic plates are magnetised by the magnet, and the magnet and ferromagnetic plates effectively form a single magnet with the north and south poles on opposite sides. As such, on the male part the first metal plate is at the north pole end of the magnet and the second metal plate is at the south pole end of the magnet. As the outer ends of the first metal plate and the second metal plate are proud of the first edge surface of the first magnet they effectively form spaced north and south poles, like those found on a horseshoe shaped magnet. It will be appreciated that this arrangement is like that commonly used on magnetic door closure mechanisms and the like. It is advantageous because the attractive power of the magnet is increased because the magnetic flux is focussed by the ferromagnetic plates on either side of it. The opposite arrangement is provided on the female part as the third metal plate is at the south pole end of the magnet and the fourth metal plate is at the north pole end. As such, the outer ends of the first metal plate and the third metal plate have the opposite polarity and are attracted to one another, while being magnetically repelled by the same polarity of the outer ends of the fourth metal plate and second metal plate respectively. Likewise, the outer ends of the second metal plate and fourth metal plate have the opposite polarity and are magnetically attracted to one another while being magnetically repelled by the same polarity of the outer ends of the third metal plate and first metal plate respectively. The combination of these forces results in the first metal surface and the second metal surface snapping together when they are brought into proximity with one another in general magnetic alignment.

This arrangement of metal plates results in the first metal surface comprising two portions spaced apart from one another, namely the outer end of the first metal plate and the outer end of the second metal plate. Likewise, the second metal surface also comprises two portions spaced apart from one another, namely the outer end of the third metal plate and the outer end of the fourth metal plate. The outer end of the first metal plate and the outer end of the second metal plate can be angled at 45 degrees to the first direction in order to form the angular shape of the first metal surface. Likewise, the outer end of the third medal plate and the outer end of the fourth metal plate can be angled at 45 degrees to the second direction in order to form the angular shape of the second metal surface.

It will be appreciated that the gap between the outer end of the first metal plate and the outer end of the second metal plate is equal in width to that of the first magnet. This gap facilitates the provision of the wall between them, in the orientation and location on the second side as explained above. Likewise, the gap between the outer end of the third metal plate and the outer end of the fourth metal plate is equal in width to that of the second magnet. This gap facilitates the formation of the trough between them, in the orientation and location on the fourth side as explained above.

The wall can protrude beyond the outer ends of the first metal plate and the second metal plate and can be made from a non-ferromagnetic material. This is important because the wall does not then interfere with the magnetic flux generated by the outer ends of the first metal plate and the second metal plate.

The male part can comprise a first frame comprising a first frame side, a second frame side parallel with the first frame side, a first outer side normal to the first frame side, and a first opening extending from the first frame side to the second frame side. The first magnet can be disposed in the first opening, the first metal plate can be disposed against the first frame side overlying the first opening, and the second metal plate can be disposed against the second frame side overlying the first opening. The first frame can be shaped such that the first outer side can protrude beyond the first metal surface and form the top surface of the wall. The female part can comprise a second frame comprising a third frame side, a fourth frame side parallel with the third frame side, a second outer side normal to the third frame side, and a second opening extending from the third frame side to the fourth frame side. The second magnet can be disposed in the second opening, the third metal plate can be disposed against the third frame side overlying the second opening, and the fourth metal plate can be disposed against the fourth frame side overlying the second opening. The second frame can be shaped such that the second outer side is shy of the second metal surface and can form the bottom surface of the trough.

The first frame and second frame can be made from a non-metallic material, such that the wall and the trough are not magnetically attracted to one another. In particular, the first frame and second frame can be made from a plastics material or the like. In particular the first frame and second frame can be an integral part of two items the magnetic connector is intended to connect together, such as two perpendicular walls of a box file.

Preferably the first frame side can comprises a first socket comprising a first inner wall and a first bottom wall. The first metal plate can be disposed in the first socket with a first inner end thereof in contact with the first inner wall and a first underside thereof in contact with the first bottom wall. The second frame side can comprise a second socket comprising a second inner wall and a second bottom wall, and the second metal plate can be disposed in the second socket with a second inner end thereof in contact with the second inner wall and a second underside thereof in contact with the second bottom wall. The third frame side can comprise a third socket comprising a third inner wall and a third bottom wall. The third metal plate can be disposed in the third socket with a third inner end thereof in contact with the third inner wall and a third underside thereof in contact with the third bottom wall. The fourth frame side can comprise a fourth socket comprising a fourth inner wall and a fourth bottom wall. The fourth metal plate can be disposed in the fourth socket with a fourth inner end thereof in contact with the fourth inner wall and a fourth underside thereof in contact with the fourth bottom wall.

This construction facilitates the positional relationship between the first magnet and the first metal plate and the second metal place, and between the second magnet and the third metal plate and the fourth metal plate. Namely, the first inner wall and the second inner wall can be located relative to the first opening such that the outer end of the first metal plate and the outer end of the second metal plate are proud of the first edge surface of the first magnet in the first direction, which is the direction the first inner wall and second inner wall face. The first inner wall and second inner wall can also be located relative to the first outer side of the first frame such that the first outer side is proud of the outer end of the first metal plate and the outer end of the second metal plate. Likewise, the third inner wall and the fourth inner wall can be located relative to the second opening such that the outer end of the third metal plate and the outer end of the fourth metal plate are proud of the second edge surface of the second magnet in the second direction, which is the direction the third inner wall and fourth inner wall face. The third inner wall and fourth inner wall can also be located relative to the second outer side of the second frame such that the second outer side is shy of the outer end of the third metal plate and the outer end of the fourth metal plate.

Following on from the above, preferably the first inner wall and the second inner wall can be in line with one another, and the first metal plate can have a greater length in the first direction than the second metal plate. This additional length can be such that the 45 degree angled outer end of the first metal plate is in line with the 45 degree angled outer end of the second metal plate on the other side of the gap between them. Likewise, the third inner wall and the fourth inner wall can be in line with one another, and the third metal plate can have a greater length in the second direction than the fourth metal plate. Again, this additional length can be such that the 45 degree angled outer end of the third metal plate is in line with the 45 degree angled outer end of the fourth metal plate on the other side of the gap between them.

In one embodiment of the invention the magnetic connector can comprise a tri-part magnetic connector comprising the male part, the female part and a bracing part. The second metal plate can comprise a first tab proud of a top side of the first frame, and the fourth metal plate can comprise a second tab proud of a top side of the second frame. The bracing part can then comprise a panel comprising a first panel socket for receiving the first tab, and a second panel socket for receiving the second tab.

With this arrangement the bracing part effectively locks the male part and the female part together by holding the first tab and the second tab in place. This construction finds particular application in a box structure with a lid, such as box file, as the bracing part can be provided at the corners of the lid where it overlies the magnetic connectors in the lid closed position.

The bracing part can be non-magnetic, but preferably the bracing part can be at least partially formed from a ferromagnetic metal. As such, it will be magnetically attracted onto the male part and the female part. As described above the first metal plate and the second metal plate are the opposite north and south poles of the formed sandwich magnet structure of the first magnet, and the third metal plate and the fourth metal plate are the opposite south and north poles of the formed sandwich magnet structure of the second magnet. As these two sets of magnetic poles extend away from each other at 90 degrees from the point of contact between the first metal surface and the second metal surface, they provide an area which will act to magnetically attract the bracing part. It will be appreciated that this magnetic attraction force will be less than that experienced between the male part and the female part, but it is sufficient to hold the bracing part in place.

In one version of the invention a layer of paper, fabric or plastics material is overlaid over the first metal surface and the second metal surface. This is done for aesthetic purposes. In such a construction the first metal surface and the second metal surface will not come into direct contact with one another, but the additional layer is such that it does not interfere with the magnetic connection between the male part and the female part enough to prevent it working sufficiently well.

As described above, the magnetic connector of the invention can be used to connect any two items together at an angle to one another. However, the primary purpose of the present invention is to connect adjacent side walls of a box file, ring binder or other box.

Therefore, according to a second aspect of the present invention, a box comprises a front wall, a rear wall, a top wall, a bottom wall, a left wall and a right wall, in which freely rotating hinges are provided along edges of said box between said rear wall and each of said top wall, bottom wall, left wall and right wall, and in which a magnetic connector as claimed in any of claims 3 to 10 below is provided at edges of said box between said bottom wall and said left wall, between said left wall and said top wall, between said top wall and said right wall and between said right wall and said bottom wall.

The terms front wall, rear wall, top wall, bottom wall, left wall and right wall are relative, and are used for illustrative purposes herein, because the box in question could be for any purpose. However, if referring to a box file the front wall would normally be described as the lid, and the left wall the spine.

With this construction 45 degree angled magnetic connectors can be used to releasably hold the walls of a box file together. When manually released the freely rotating hinges allow the bottom wall, left wall, top wall and right wall to rotate until they are at least co-planar with the rear wall. This allows the box file to be readily opened up and laid flat for easy access. To reconstruct the box shape the bottom wall, left wall, top wall and right wall are manually rotated up through 90 degrees until the male part and the female part of each of the magnetic connectors are close enough to one another to be attracted together. As described above, the magnetic forces at work will snap the male part and the female part together, and locate the wall in the trough in each case.

The front wall can then comprise bracing parts like those described above at each corner thereof, which in each case then comprise the bracing part of a tri-part magnetic connector.

In one embodiment of the second aspect of the present invention the magnetic connectors between the bottom wall and the left wall, and between the left wall and the top wall (i.e. those at the top and bottom of the spine of a box file) can comprise a modified male or female part, whichever faces away from the right wall. If it is a male part, the second metal plate can comprise a tail portion in line with the first magnetic plate in the first direction and spaced apart therefrom. If it is a female part, the fourth metal plate can comprise a tail portion in line with the third magnetic plate in the second direction and spaced apart therefrom. With this arrangement the external facing side of the male part or female part comprises a north pole surface and a south pole surface. As such, it acts like the poles of a horseshoe shaped magnet. With this arrangement provided at the bottom and the top of the left wall (the spine if a box file) the box can be magnetically connected to ferromagnetic bodies with which the box is used. In particular, two spaced apart ferromagnetic strips mounted to a wall above a shelf can be utilised to retain a box file upright in place on the shelf. In fact, such an arrangement can allow multiple boxes according to the second aspect of the present invention to be mounted in such a way next to each other.

In addition to the above either or both of the magnetic connectors between the top wall and the right wall, and between the right wall and the bottom wall (i.e. the two at the opposite end of the box file to the spine) can be provided with modified male parts like those described above and with a first ferromagnetic body and/or a second ferromagnetic body mounted in the rear wall. The first body is disposed at a location magnetically coincident with the location of the external side of the male part of the magnetic connector between the top wall and the right wall when it is rotated a full 270 degrees on the associated freely rotating hinge from the connected position. Alternatively, or in addition to this, the second body can be disposed at a location magnetically coincident with the location of the external side of the male part of the magnetic connector between the right wall and the bottom wall when it is rotated at full 270 degrees on the associated freely rotating hinge from the connected position. With these constructions, the top wall and/or the right wall and/or the bottom wall can be folded completely under the rear wall and then be held in place by the magnetic connection between the male parts in question and the associated first body and/or second body. This may be convenient if the box file is accessed directly for work and/or is to be moved in a fully open configuration. A number of derivatives of this construction are described in further detail below.

The present invention can be performed in various ways, but three embodiments will now be described by way of example and with reference to the accompanying drawings, in which.

Figure 1:
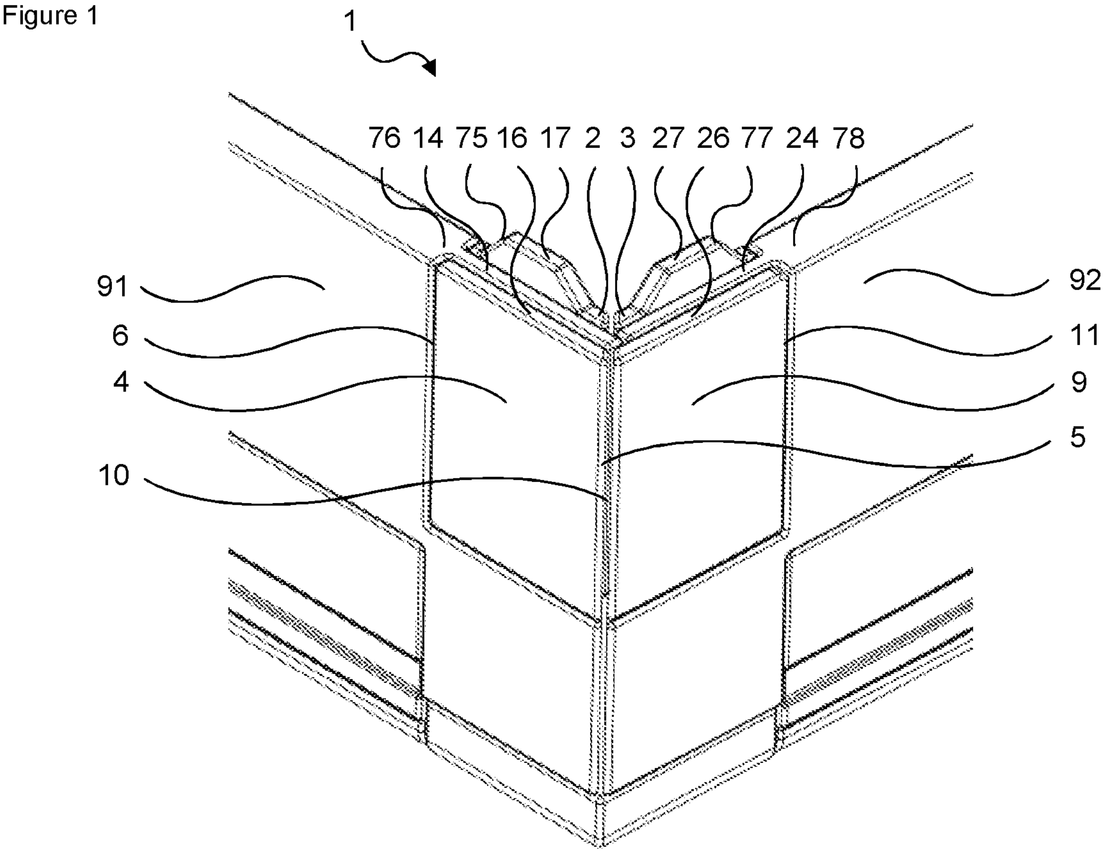
FIG. 1 is a perspective view of a magnetic connector according to the first aspect of the present invention in a connected position.
Figure 2:
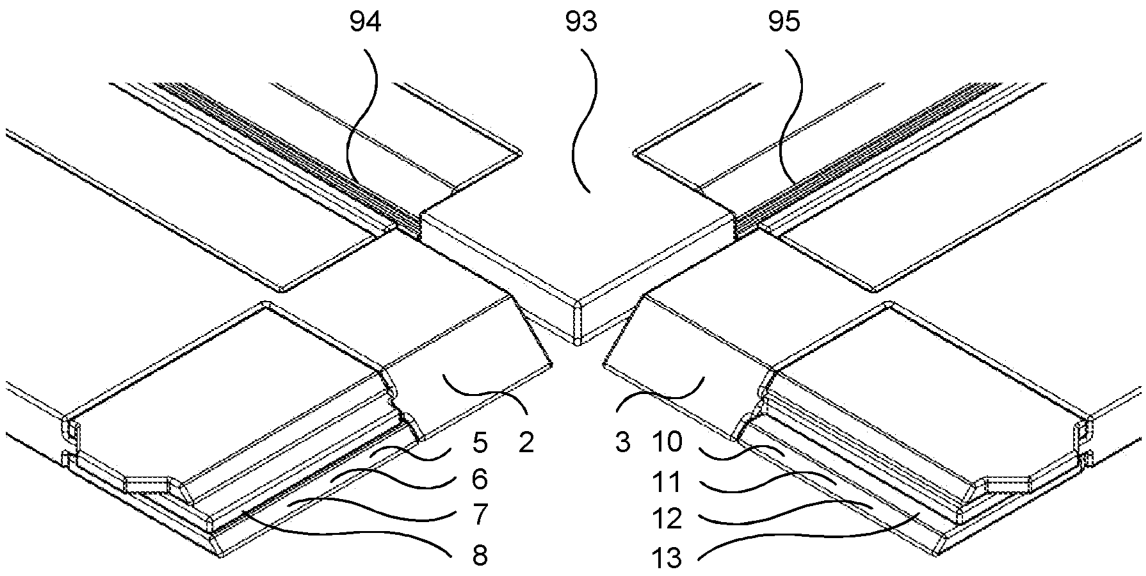
FIG. 2 is a perspective view of the magnetic connector as shown in FIG. 1 in a disconnected position.
Figure 3:
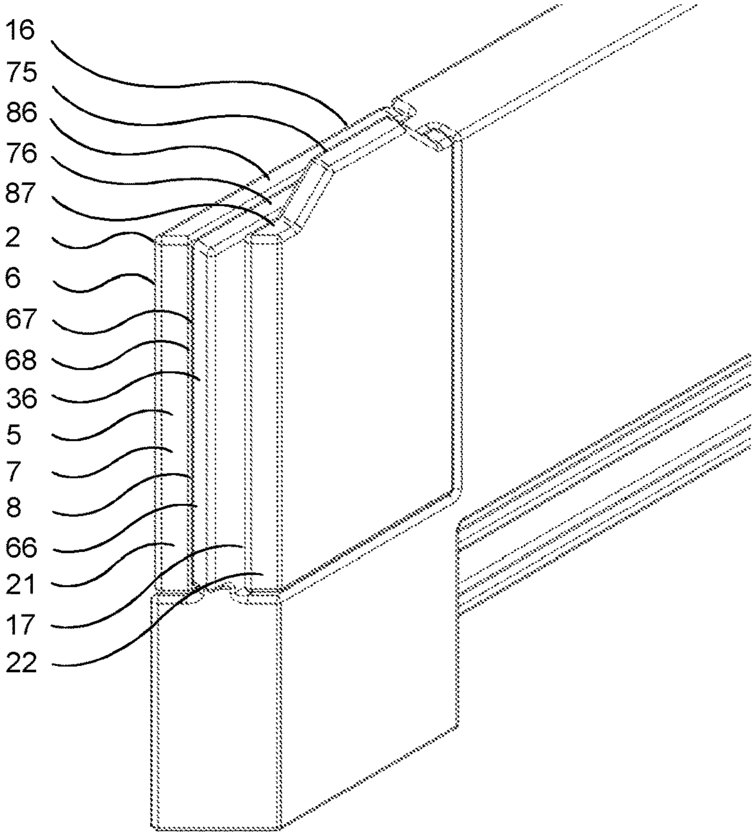
FIG. 3 is a perspective view of the male part of the magnetic connector as shown in FIG. 1.

As shown in FIGS. 1 and 2 a magnetic connector 1 comprises a male part 2 and a female part 3. The male part 2 comprises a first side 4 and a second side 5 extending from the first side 4 at an oblique angle thereto, which in this case is 45 degrees. The male part 2 comprises a first metal portion 6 comprising a first metal surface 7 on the second side 5. The second side 5 also comprises a protrusion proud of the first metal surface, in the form of elongate wall 8. The female part 3 comprises a third side 9 and a fourth side 10 extending from the third side 9 at an oblique angle thereto, which is also 45 degrees. The female part 3 comprises a second metal portion 11 comprising a second metal surface 12 on the fourth side 10. The fourth side 10 also comprises a slot for receiving the protrusion, in the form of elongate trough 13. As explained further below, at least one of the first metal portion 6 and the second metal portion 11 is magnetic and attracts the other.

Figure 5:
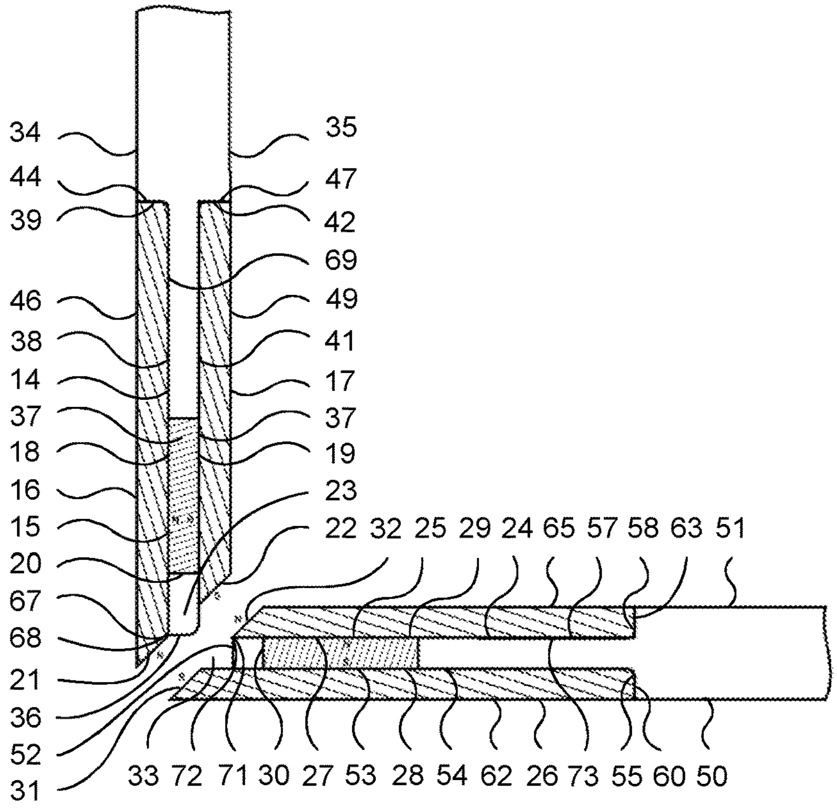
FIG. 5 is a cross-sectional top view of the magnetic connector shown in FIG. 1.
Figure 6:
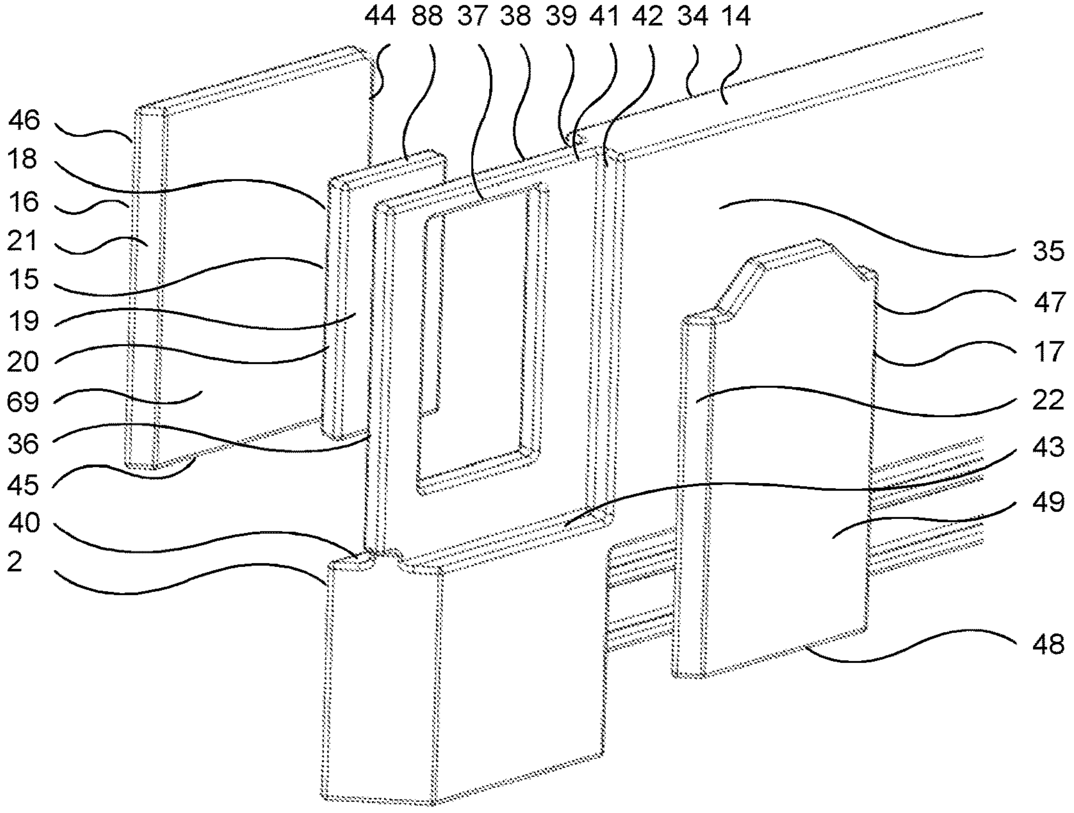
FIG. 6 is an exploded perspective view of the male part as shown in FIG. 3.

The first metal portion 6 is a sandwich magnet structure formed around a first frame 14, most clearly seen in FIG. 6. It comprises a first magnet 15, a first ferromagnetic metal plate 16 and a second ferromagnetic metal plate 17. As shown in FIG. 6, the first magnet 15 is tile-shaped and comprises a first face 18, a second face 19 and a first edge surface 20, which in FIG. 6 is the right-most of the four edge surfaces. The first magnet 15 comprise a north pole at the first face 18 and a south pole at the second face 19. The first metal plate 16 is magnetically connected to the first face 18 and the second metal plate 17 is magnetically connected to the second face 19, as illustrated in FIG. 5. As is also clear from FIG. 5, the first metal plate 16 and the second metal plate 17 are located with outer ends 21 and 22 thereof proud of the first edge surface 20 in a first direction, which is downwards in FIG. 5. The outer ends 21 and 22 of the first metal plate 16 and the second metal plate 17 combine to form the first metal surface 7. It will be appreciated that the first metal surface 7 therefore comprises two portions spaced apart from one another, namely the outer ends 21 and 22, which have a gap 23 between them which is the same width as the first magnet 15.

The second metal portion 11 also comprises a sandwich magnet structure formed around a second frame 24. It comprises a second magnet 25, a third ferromagnetic metal plate 26 and a fourth ferromagnetic metal plate 27. The second magnet 25 is the same as first magnet 15, and is tile-shaped with a third face 28, a fourth face 29 and a second edge surface 30, which in FIG. 5 is the left-most of the four edge surfaces. The second magnet 25 comprises a south pole at the third face 28 and a north pole at the fourth face 29, and is hence arranged with its poles in the opposite orientation to first magnet 15. The third metal plate 26 is magnetically connected to the third face 28 and the fourth metal plate 27 is magnetically connected to the fourth face 29, as illustrated in FIG. 5. The third metal plate 26 and the fourth metal plate 27 are located with outer ends 31 and 32 thereof proud of the second edge surface 30 in a second direction, which is to the left in FIG. 5. The outer ends 31 and 32 of the third metal plate 26 and the fourth metal plate 27 combine to form the second metal surface 12. Again, it will be appreciated that the second metal surface 12 therefore comprises two portions spaced apart from one another, namely the outer ends 31 and 32, which have a gap 33 between them which is the same width as the second magnet 25.

With these sandwich magnet arrangements the ferromagnetic plates 16, 17, 26 and 27 are magnetised by the magnets 15 and 25 they are connected to, and the first metal portion 6 and the second metal portion 11 each effectively form a single magnet with the north and south poles on opposite sides respectively. As such, on the male part 2 the first metal plate 16 is at the north pole end of the sandwich assembly and the second metal plate 17 is at the south pole end. As the outer ends 21 and 22 of the first metal plate 16 and the second metal plate 17 are proud of the first edge surface 20 of the first magnet 15 they effectively form spaced north and south poles, like those found on a horseshoe shaped magnet. The opposite arrangement is provided on the female part 3 as the third metal plate 26 is at the south pole end of the sandwich assembly and the fourth metal plate 27 is at the north pole end. As such, the outer ends 21 and 31 of the first metal plate 16 and the third metal plate 26 have the opposite polarity and are attracted to one another, while being magnetically repelled by the same polarity of the outer ends 22 and 32 of the fourth metal plate 27 and second metal plate 17 respectively. Likewise, the outer ends 22 and 32 of the second metal plate 17 and fourth metal plate 27 have the opposite polarity and are magnetically attracted to one another while being magnetically repelled by the same polarity of the outer ends 31 and 21 of the third metal plate 26 and first metal plate 16 respectively. The combination of these forces results in the first metal surface 7 and the second metal surface 12 snapping together when they are brought into proximity with one another in general magnetic alignment.

The first frame 14 comprises a first frame side 34, a second frame side 35 parallel with the first frame side 34, a first outer side 36 normal to the first frame side 34, and a first opening 37 extending from the first frame side 34 to the second frame side 35. The first frame side 34 comprises a first socket 38 comprising a first inner wall 39 and a first bottom wall 40. The second frame side 35 comprises a second socket 41 comprising a second inner wall 42 and a second bottom wall 43. As is clear from FIG. 6, the first opening 37 is rectangular and is shaped to receive the first magnet 15 therein. Further, the first frame 14 is substantially the same width in the region of the first opening 37 as the first magnet 15, so the first face 18 is in line with the first frame side 34 in the region of the first opening 37, and so the second face 19 is also in line with the second frame side 35 in the region of the first opening 37.

As is also clear from FIG. 6, the first socket 38 is shaped to receive the first metal plate 16 therein, with a first inner end 44 thereof in contact with the first inner wall 39 and a first underside 45 thereof in contact with the first bottom wall 40. In this position the first metal plate 16 overlies the first opening 37 so it is connected to the first magnet 15. The first socket 38 has a depth which is substantially the same as the width of the first metal plate 16, so an external side 46 of the first metal plate 16 is in line with the first frame side 34 in the region of the first socket 38. Likewise the second socket 41 is shaped to receive the second metal plate 17 therein, with a second inner end 47 thereof in contact with the second inner wall 42 and a second underside 48 thereof in contact with the second bottom wall 43. In this position the second metal plate 17 overlies the first opening 37 so it is connected to the first magnet 15. Again, the second socket 41 has a depth which is substantially the same as the width of the second metal plate 17, so an internal side 49 of the second metal plate 17 is in line with the second frame side 35 in the region of the first socket 38.

The same construction is provided on the female part 3. Referring to FIG. 5, the second frame 24 comprises a third frame side 50, a fourth frame side 51 parallel with the third frame side 50, a second outer side 52 normal to the third frame side 50, and a second opening 53 extending from the third frame side 50 to the fourth frame side 51. The third frame side 50 comprises a third socket 54 comprising a third inner wall 55 and a third bottom wall 56 (visible in FIG. 4). The fourth frame side 51 comprises a fourth socket 57 comprising a fourth inner wall 58 and a fourth bottom wall 59 (visible in FIG. 4). The second opening 53 is rectangular and is shaped to receive the second magnet 25 therein. Further, the second frame 24 is substantially the same width in the region of the second opening 53 as the second magnet 25, so the third face 28 is in line with the third frame side 50 in the region of the second opening 53, and the so the fourth face 29 is also in line with the fourth frame side 51 in the region of the second opening 53.

Figure 4:
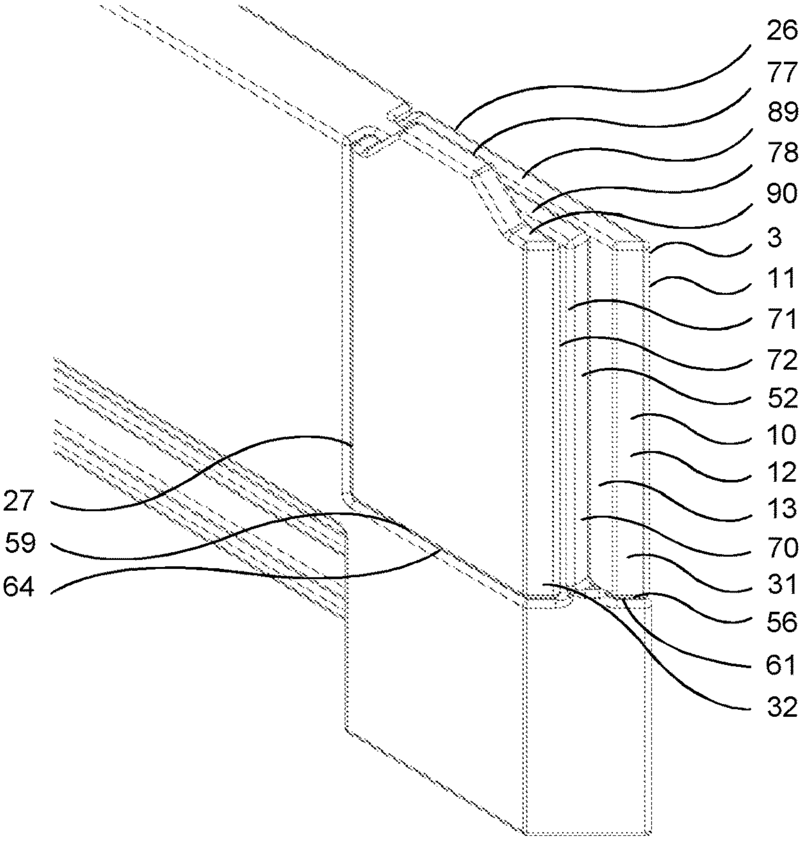
FIG. 4 is a perspective view of the female part of the magnetic connector as shown in FIG. 1.

As is clear from FIG. 4, the third socket 54 is shaped to receive the third metal plate 26 therein, with a third inner end 60 thereof in contact with the third inner wall 55 and a third underside 61 thereof in contact with the third bottom wall 56. In this position the third metal plate 26 overlies the second opening 53 so it is connected to the second magnet 25. The third socket 54 has a depth which is substantially the same as the width of the third metal plate 26, so an external side 62 of the third metal plate 26 is in line with the third frame side 50 in the region of the third socket 54. Likewise the fourth socket 57 is shaped to receive the fourth metal plate 27 therein, with a fourth inner end 63 thereof in contact with the fourth inner wall 58 and a fourth underside 64 thereof in contact with the fourth bottom wall 59. In this position the fourth metal plate 27 overlies the second opening 53 so it is connected to the second magnet 25. Again, the fourth socket 57 has a depth which is substantially the same as the width of the fourth metal plate 27, so an internal side 65 of the fourth metal plate 27 is in line with the fourth frame side 51 in the region of the fourth socket 57.

This frame construction facilitates the positional relationship between the first magnet 15 and the first metal plate 16 and the second metal place 17, and between the second magnet 25 and the third metal plate 26 and the fourth metal plate 27. Namely, the first inner wall 39 and the second rear inner 42 are located relative to the first opening 37 such that the outer ends 21 and 22 of the first metal plate 16 and the second metal plate 17 are proud of the first edge surface 20 of the first magnet 15 in the first direction, which is the direction the first inner wall 39 and second inner wall 42 face. Likewise, the third inner wall 55 and the fourth inner wall 58 are located relative to the second opening 53 such that the outer ends 31 and 32 of the third metal plate 26 and the fourth metal plate 27 are proud of the second edge surface 30 of the second magnet 15 in the second direction, which is the direction the third inner wall 55 and fourth rear wall 58 face.

Referring now to the protrusion and slot feature, the second side 5 has a rectangular shape with a greater length than width, and the wall 8 is elongate and extends in a lengthwise direction of the second side 5 equidistant from opposite lengthwise sides thereof and intersecting the first metal surface 7. In particular, the wall 8 is provided only in the region of the first metal surface 7 and extends along its length. It does not extend below this on the second side 5. Likewise, the fourth side 10 has a corresponding rectangular shape with a greater length than width, and the trough 13 is elongate and extends in a lengthwise direction of the fourth side 10 substantially equidistant from opposite lengthwise sides thereof and intersecting the second metal surface 12. In particular, the trough 13 is provided only in the region of the second metal surface 12 and extends along its length. It does not extent below this on the fourth side 10. The purpose of these shapes is to provide the maximum resistance to inbound sheer forces. The lengthwise extent of the wall 8 and trough 13 mean that such inbound sheer forces are resisted along the length of the magnetic connection between the male part 2 and the female part 3.

As is clear from the Figures, the internal angle between the first side 4 and the second side 5 of the male part 2, and the internal angle between the third side 9 and the fourth side 10 of the female part are both 45 degrees. As such, when the second side 5 and the fourth side 10 are in contact with one another as shown in FIG. 1, the first side 4 and the third side 9 are arranged at 90 degrees to one another. In order to facilitate this the outer ends 21 and 22 of the first metal plate 16 and the second metal plate 17 are angled at 45 degrees to the first direction. Likewise, the outer ends 31 and 32 of the third medal plate 26 and the fourth metal plate 27 are angled at 45 degrees to the second direction. To make this so the first metal plate 16 has a greater length in the first direction than the second metal plate 17, and this additional length is such that the 45 degree angled outer end 31 of the first metal plate 16 is in line with the 45 degree angled outer end 32 of the second metal plate 17 on the other side of the gap 23 between them. This structure happens as a result of the fact that the first inner wall 39 and the second inner wall 42 are in line with one another. Likewise, the third metal plate 26 has a greater length in the second direction than the fourth metal plate 27. Again, this additional length is such that the 45 degree angled outer end 31 of the third metal plate 26 is in line with the 45 degree angled outer end 32 of the fourth metal plate 27 on the other side of the gap 33 between them. This structure happens because the third inner wall 55 and the fourth inner wall 58 are in line with one another.

Following on from this, it is clear from the Figures that the wall 8 is a part of the first frame 14, and is formed because the first outer side 36 protrudes beyond the first metal surface 7 and comprises a top surface 66 of the wall 8. The first outer side 36 is not proud of the first metal surface 7 in the first direction due to the greater length of the first metal plate 16 in the first direction as outlined above, rather it is proud of the 45 degree angled plane of the first metal surface 7. An external corner 67 of the first outer side 36 is actually level with an internal corner 68 of the outer end 31 of the first metal plate 16 in the first direction. (Note that the terms “internal” and “external” used here are relative to the inside of the 90 degree angled relationship between the male part 2 and the female part 3.) As the first outer side 36 is normal to the first frame side 34 the top surface 66 of the wall 8 is at 45 degrees to the first metal surface 7, and the wall 8 has a triangular cross-sectional shape. The first outer side 36 protrudes beyond the first metal surface 7 in this way because the first inner wall 39 is spaced from the first outer side 36 the same distance as an internal side 69 the first metal plate 16 extends in the first direction, and because the second inner wall 42 is spaced a greater distance from the first outer side 36 than the distance the second metal plate 17 extends in the first direction.

The trough 13 is formed as a result of the second outer side 52 being shy of the outer ends 31 and 32 of the third metal plate 26 and the fourth metal plate 27, and forming a bottom surface 70 of the trough. The second outer side 52 is not shy of the second metal surface 12 in the second direction, because of the shorter length of the fourth metal plate 27 in the second direction as outline above, rather it is shy of the 45 degree angled plane of the second metal surface 12. An internal corner 71 of the second outer side 52 is actually level with an external corner 72 of the outer end 32 of the fourth metal plate 27 in the second direction. As the second outer side 52 is normal to the third frame side 50 the bottom surface 70 of the trough 13 is at 45 degrees to the second metal surface 12, and the trough 13 has a triangular cross-sectional shape corresponding to that of the wall 8. The wall 8 therefore fits neatly into the trough 13 in use. The second outer side 52 is shy of the second metal surface 12 in this way because the third inner wall 55 is spaced a shorter distance from the second outer side 52 than the distance the third metal plate 26 extends in the second direction, and because the fourth inner wall 58 is spaced from the second outer side 52 the same distance as an external side 73 of the fourth metal plate 27 extends in the second direction.

The first frame 14 and the second frame 24 are made from a non-metallic plastics material, such that the wall 8 and the trough 13 are not magnetically attracted to one another, and so the wall 8 does not then interfere with the magnetic flux generated by the outer end 21 of the first metal plate 16 and the outer end 22 of the second metal plate 17.

Figure 7:
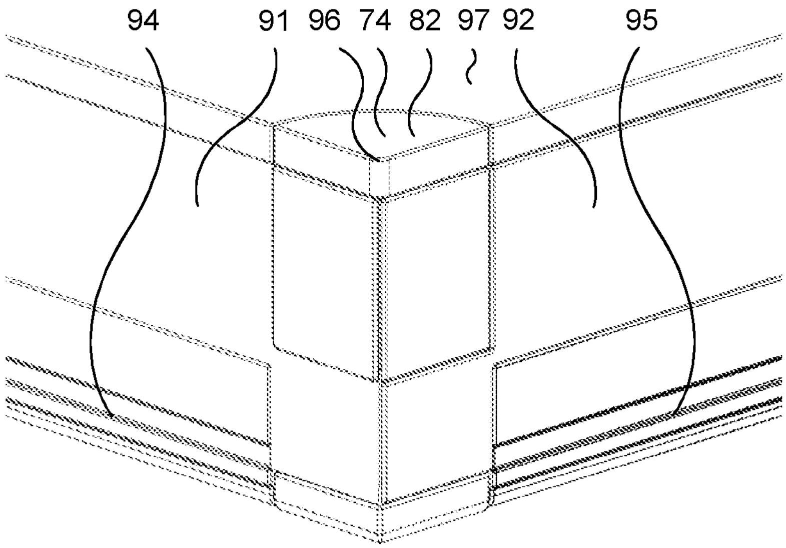
FIG. 7 is a perspective view of the magnetic connector shown in FIG. 1.
Figure 8:
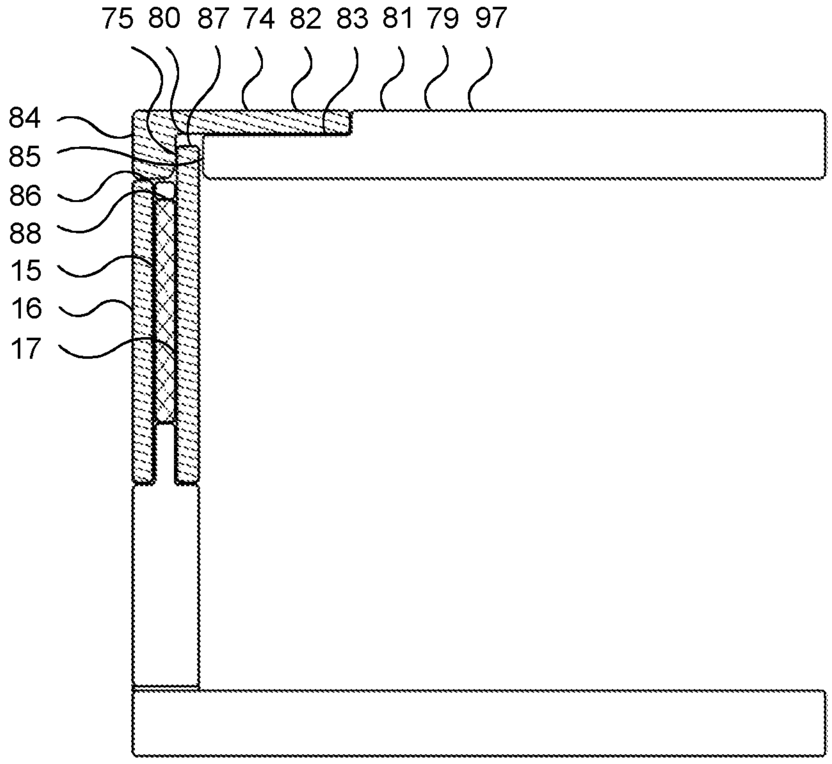
FIG. 8 is a cross-sectional side view of the magnetic connector shown in FIG. 1.

Referring to FIGS. 1, 7 and 8 the magnetic connector 1 also comprises a bracing part 74 which serves to hold the male part 2 and the female part 3 together in the connected position. In order to facilitate this second metal plate 17 comprises a first tab 75 proud of a top side 76 of the first frame 14, and the fourth metal plate 27 comprises a second tab 77 proud of a top side 78 of the second frame 24. As is clear from FIG. 1, in the connected position the first tab 75 and the second tab 77 are arranged at 90 degrees to one another. The bracing part 74 comprises a panel 79 comprising a first panel socket 80 for receiving the first tab 75, as shown in FIG. 8, and a second panel socket (not visible) for receiving the second tab 77 in the same way. The first panel socket 80 and the second panel socket are arranged at 90 degrees to one another in a corresponding position to the first tab 75 and the second tab 77 in the connected position. With this arrangement the bracing part 74 effectively locks the male part 2 and the female part 3 together by holding the first tab 75 and the second tab 77 in place.

Referring to FIG. 8, the bracing part 75 comprises a non-magnetic first part 81, and a ferromagnetic second part 82. The first part 81 comprises a panel socket 83 in which the second part 82 is secured. The second part 82 comprises a downwardly depending flange portion 84 which is spaced from an end 85 of the first part 81 so as to form the first panel socket 80. The same arrangement is provided at 90 degrees to the elevation shown in FIG. 8 to form the second panel socket.

As the second part 82 is ferromagnetic it is magnetically attracted onto the male part 2 and the female part 3. As described above the first metal plate 16 and the second metal plate 17 are the opposite north and south poles of the formed sandwich magnet structure of the first magnet 15, and the third metal plate 26 and the fourth metal plate 27 are the opposite south and north poles of the formed sandwich magnet structure of the second magnet 25. The first metal plate 16 and the second metal plate 17 are dimensioned such that top sides 86 and 87 thereof are proud of a top side 88 of the first magnet 15 when the first magnet 15, first metal plate 16 and second metal plate 17 are mounted to the first frame 14 in the manner described above. Likewise, as shown in FIG. 4, the third metal plate 26 and the fourth metal plate 27 are dimensioned such that top sides 89 and 90 thereof are proud of a top side (not visible) of the second magnet 25 when the second magnet 25, the third metal plate 26 and the fourth metal plate 27 are mounted to the second frame 24 in the manner described above. As a result, the top sides 86 and 87 of the first metal plate 16 and the second metal plate 17 form upwardly facing north and south poles of the assembly of the first magnet 15, and the top sides 89 and 90 of the third metal plate 26 and the fourth metal plate 27 form upwardly facing south and north poles of the assembly of the second magnet 25. In this way there are in effect two horseshoe shaped magnet like arrangements set at 90 degrees to one another, each one of which will exert an attractive force on the second part 82 of the panel 79. It will be appreciated that this magnetic attraction force will be less than that experienced between the male part 2 and the female part 3, but it is sufficient to hold the bracing part 74 in place.

As described above, the magnetic connector of the invention can be used to connect any two items together at an angle to one another. However, the primary purpose of the present invention is to connect adjacent side walls of a box file. Therefore, in this illustrative embodiment the male part 2 is provided at one end of first side wall 91 of a box file, and the female part 3 is provided at one end of a second side wall 92 thereof. The first side wall 91 and the second side wall 92 are connected to a rear wall 93 of the box file by freely rotating hinges 94 and 95 respectively, so they can be freely manually moved between the connected position shown in FIG. 1 and the disconnected position shown in FIG. 2. The first frame 14 is integrally formed as a part of the first side wall 91 and the second frame 24 is integrally formed as a part of the second side wall 92. Furthermore, the bracing part 74 is then provided at a first corner 96 of a front wall 97 of the box file, which is itself rotatable about an axis such that it can be rotated down onto the magnetic connector 1 in use.

Therefore, in use the magnetic connector 1 operates as follows. To connect the male part 2 to the female part 3 the male part 2 is rotated about the hinge 94 and the female part is rotated about the hinge 95 until the first metal surface 7 and the second metal surface 12 come into close proximity with one another. The opposite north and south magnet poles of the outer ends 21 and 31 of the first metal plate 16 and the third metal plate 26 are attracted to one another, and the opposite south and north magnetic poles of the outer ends 22 and 32 of the second metal plate 17 and the fourth metal plate 27 are attracted to one another. This draws the male part 2 and the female part 3 together, and at the same time locates the wall 8 in the trough 13. It is important to note that the magnetic forces at work also serve to prevent the male part 2 and the female part 3 from getting stuck out of position. Namely, the outer end 21 of the first metal plate 16 is repelled by the outer end 32 of the fourth metal plate 27 as they are the same polarity. This means they will not become connected together. Likewise, the outer end 22 of the second metal plate 17 is repelled by the outer end 31 of the third metal plate 26 as they are the same polarity. This means they will also not become connected together. These repelling forces work with the attractive forces to mean that the male part 2 and the female part 3 connect together cleanly in the correct position only.

Once connected in this way the magnetic forces at work serve to hold the male part 2 and the female part 3 together, while the location of the wall 8 in the trough 13 serves to resist any inbound or outbound sheer forces which are applied to the first metal surface 7 and/or the second metal surface 12. The bracing part 74 can then be brought down onto the male part 2 and the female part 3 by rotating the front wall 97 about its axis. The first tab 75 and the second tab 77 are then located in the first panel socket 80 and the second panel socket respectively, which service to further hold the male part 2 and the female part 3 together. The magnetic attraction force applied to the bracing part 74 holds it in place. The magnetic connector 1 can be disconnected in an opposite process to that described above.

Figure 9:
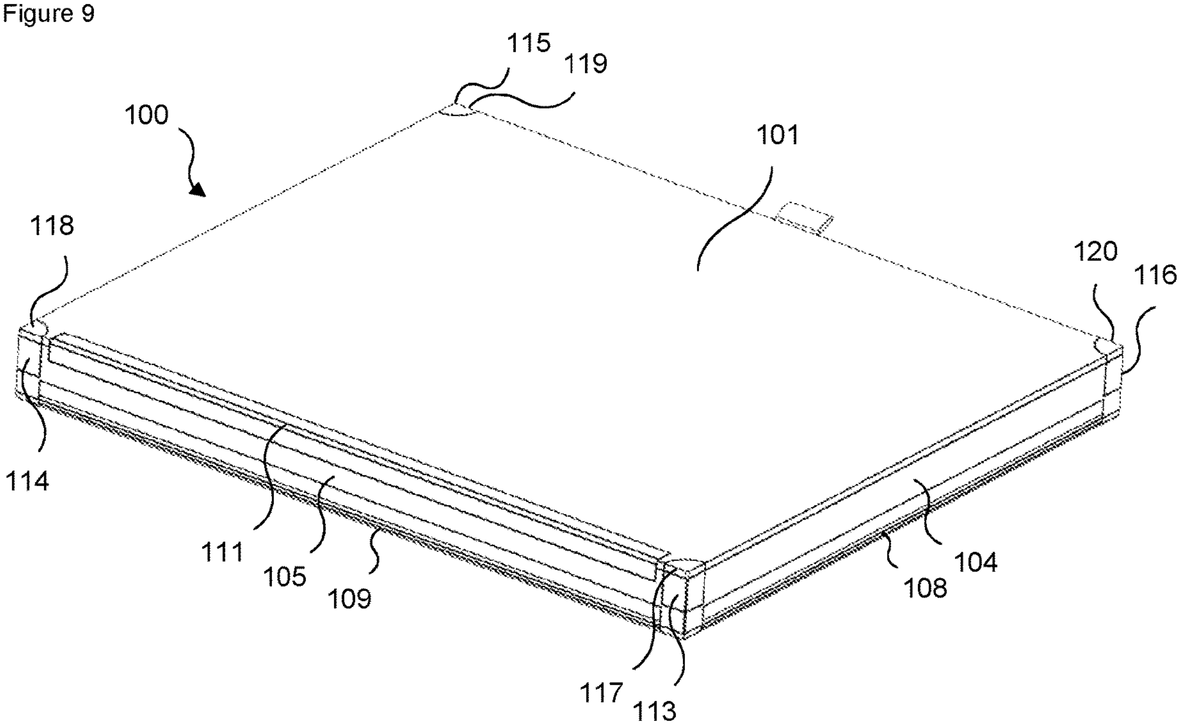
FIG. 9 is a perspective view of a first box according to the second aspect of the present invention in a closed position.
Figure 10:
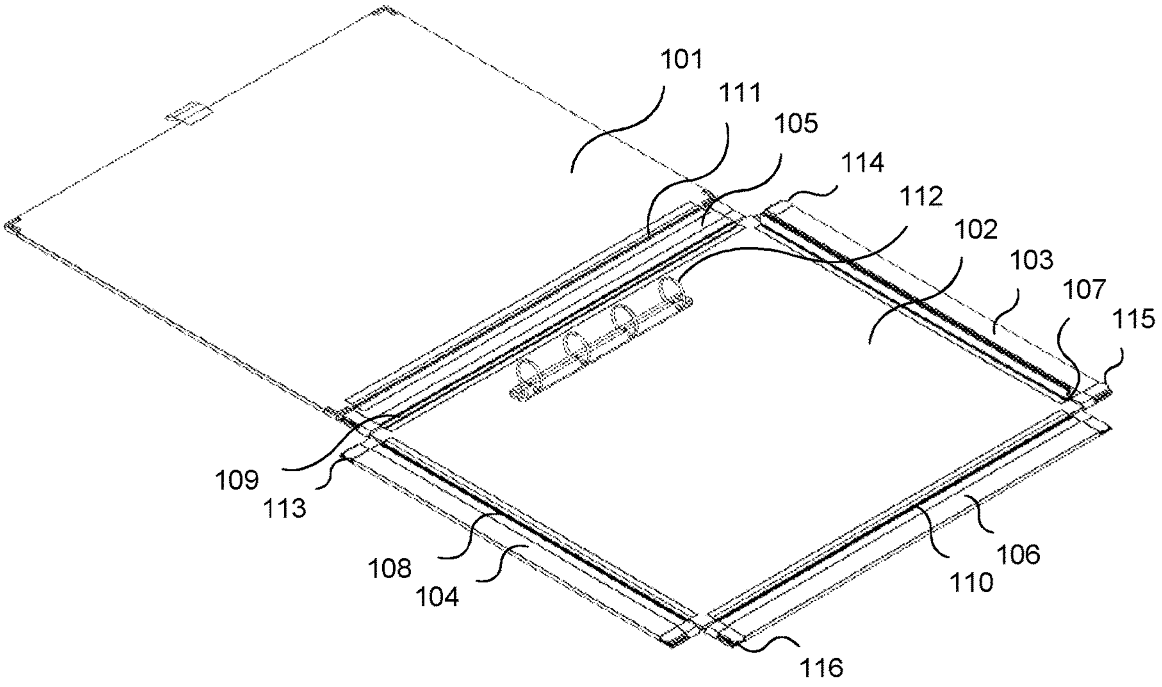
FIG. 10 is a perspective view of the first box shown in FIG. 9 in an open position.

The second aspect of the present invention provides a box featuring magnetic connectors like magnetic connector 1 described above, and such a box is shown in FIGS. 9 and 10 in which box file 100 comprises a front wall 101, a rear wall 102, a top wall 103, a bottom wall 104, a left wall 105 and a right wall 106. (The terms front wall, rear wall, top wall, bottom wall, left wall and right wall are relative, and are used for illustrative purposes herein. However, it will be appreciated from FIGS. 9 and 10 that the front wall 101 is the lid, and the left wall 105 is the spine.) Free rotating hinges 107, 108, 109 and 110 are provided between the rear wall 102 and each of the top wall 103, bottom wall 104, left wall 105 and right wall 106. A further free rotating hinge 111 is provided between the left wall 105 and the front wall 101. These free rotating hinges allow the box file 100 to be freely manually configured as a box as shown in FIG. 9 in order to store papers, and laid flat as shown in FIG. 10 in order to provide easy access to the contents. The rear wall 102 comprises ring binders 112 to retain hole punched sheets of paper.

Magnetic connectors 113, 114, 115 and 116 are provided at edges of the box file 100 where the bottom wall 104 and left wall 105 meet, where the left wall 105 and the top wall 103 meet, where the top wall 103 and the right wall 106 meet and where the right wall 106 and the bottom wall 104 meet. Each of the magnetic connectors 113-116 is the same as magnetic connector 1 described in detail above, and works in the same way to allow the bottom wall 104 and left wall 105, left wall 105 and top wall 103, top wall 103 and right wall 106, and right wall 106 and bottom wall 104 to be releasably connected to one another at 90 degrees To construct the box shape the bottom wall 104, left wall 105, top wall 103 and right wall 106 are manually rotated up through 90 degrees until the male parts and the female parts of each of the magnetic connectors 113-116 are close enough to one another to be attracted together. As described above, the magnetic forces at work will snap the male parts and the female part together, and locate the wall in the trough in each case.

The front wall 101 is provided with bracing parts 117, 118, 119 and 120 at each of its corners which are the same as bracing part 74 describe above. As such, when bottom wall 104 and left wall 105, left wall 105 and top wall 103, top wall 103 and right wall 106, and right wall 106 and bottom wall 104 are all connected to one another, the front wall 101 can be rotated about the hinge 111 to bring the bracing parts 117-120 down onto the magnetic connectors 113-116 respectively, in order to brace them in the same manner as bracing part 74 braces the magnetic connector 1 described above. The magnetic connectors 113-116 also magnetically hold the front wall 101 in place in this position. As such, the box file 100 is held in its box shape.

Figure 11:
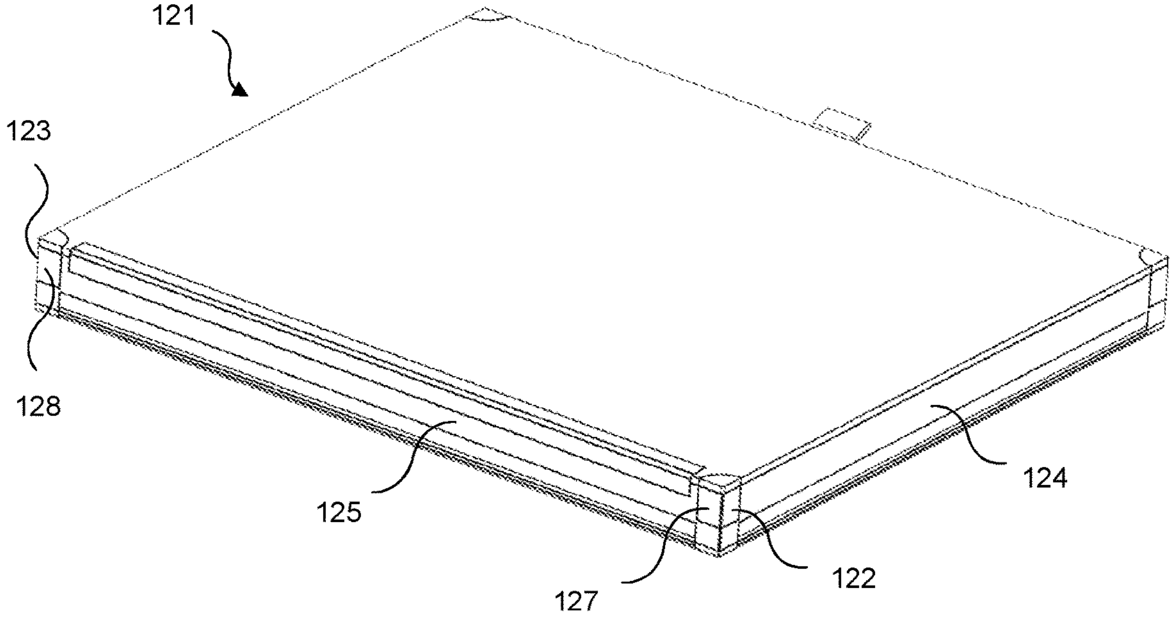
FIG. 11 is a perspective view of a second box according to the second aspect of the present invention in a closed position.
Figure 12:
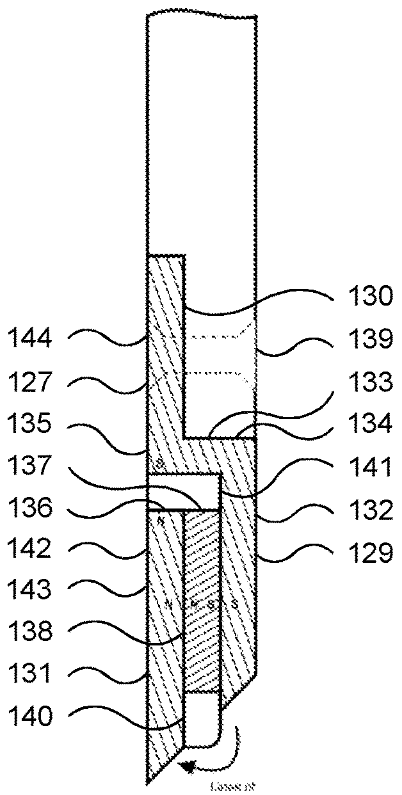
FIG. 12 is a cross-sectional top view of a male part of a magnetic connector of the second box shown in FIG. 11; and, FIG. 13 is a perspective view of the second box shown in FIG. 11 in a use configuration.
Figure 13:
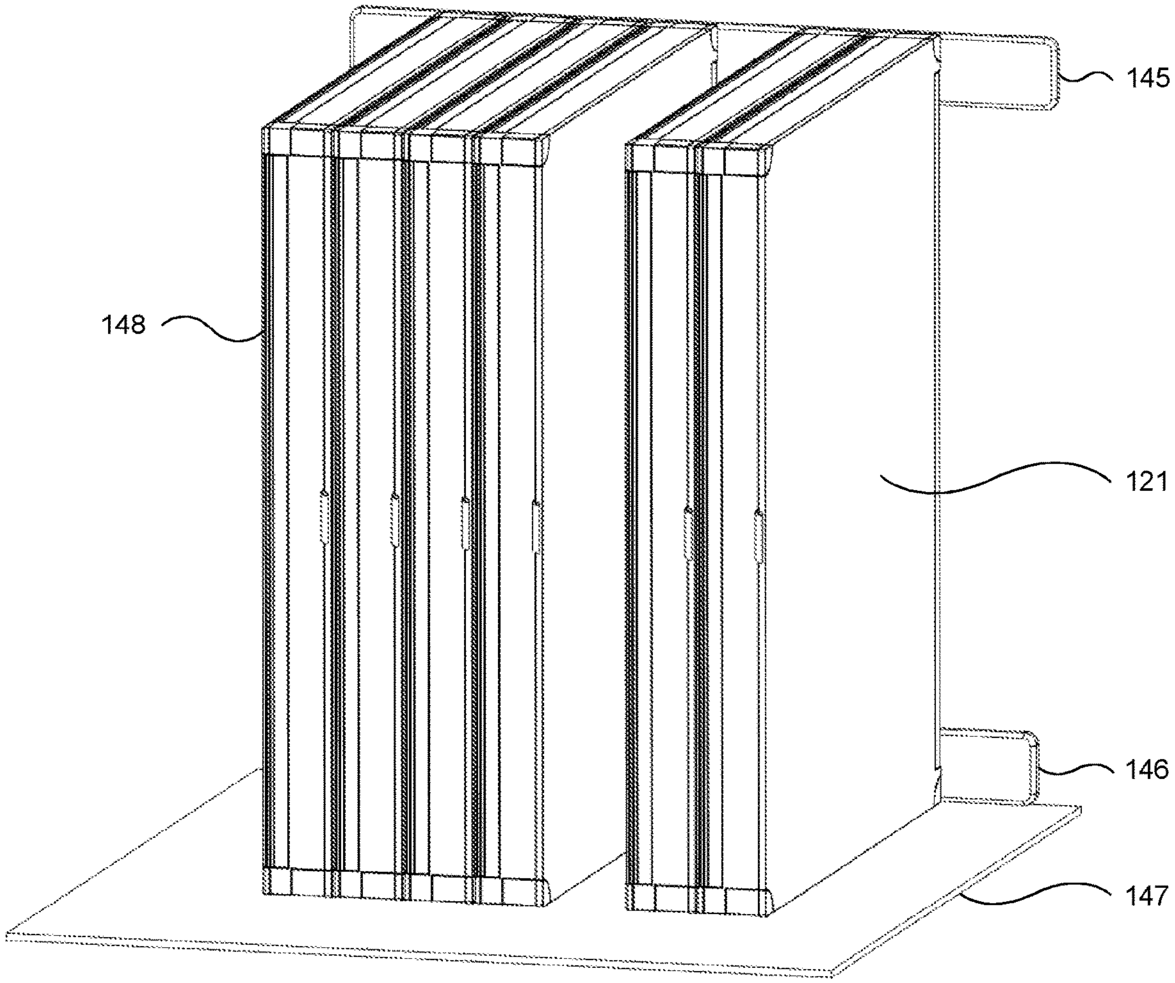

The second aspect of the present invention can be altered without departing from the scope of claim 11 below, and one further embodiment is illustrated in FIGS. 11-13. In this case box file 121 is like box file 100 described above, but the magnetic connectors 122 and 123 between the bottom wall 124 and the left wall 125, and between the left wall 125 and the top wall (not visible) (i.e. those at the top and bottom of the spine of the box file 121) comprise a modified male part 127 and 128 respectively, which are both located on the left wall 125. As shown in FIG. 12 male part 127 comprises a second metal plate 129 comprising a tail portion 130 in line with the first metal plate 131 in the first direction and spaced apart therefrom. To provide for this the second metal plate 129 has a dog-leg shape comprising a first portion 132, a mid-portion 133 extending normally from an inner end 134 of the first portion 132, and the tail portion 130 extending normally from an external end 135 of the mid-portion 133. In order to accommodate this the first magnetic plate 131 is shorter than first magnetic plate 15 described above, and its inner end 136 is level with an inner edge surface 137 of first magnet 138. The first frame 139 is provided with an appropriately sized and shaped first socket 140 to accommodate the first metal plate 131, and second socket 141 to accommodate the second metal plate 129. Male part 128 is the same as male part 127.

With this arrangement the external side 142 of the male part 127 comprises a north pole surface 143 and a south pole surface 144, which act like the poles of a horseshoe shaped magnet. The same is true of male part 128.

The purpose of this construction is to allow the box file 121 to be magnetically connected to a pair of spaced apart parallel ferromagnetic metal strips 145 and 146 in use, as shown in FIG. 13. The metal strips 145 and 146 are attached to a surface or wall above a shelf 147, as shown. The spacing between them is equal to the spacing between the male parts 127 and 128 on the left wall 125. As such, when the box file 121 is placed on the shelf 147 in use as shown, the male parts 127 and 128 are releasably magnetically connected to the metal strips 145 and 146 respectively. This ensures that the box file 121 is maintained in the upright position shown, and will not readily fall over. It also ensures that other identical box files 148 can be mounted to the shelf 147 in the same way, which serves to stabilise all of them collectively, and keep then in a neat row.

The second aspect of the present invention can be altered without departing from the scope of claim 11. In particular, in one alternative embodiment (not shown) a box file is provided which is the same as box file 121 described above, except that modified female parts are provided on the left wall which have a likewise configuration of metal plates as male parts 127 and 128 described above. Namely, the fourth metal plate has a tail portion like tail portion 130, and the third metal plate is short in length like the first metal plate 131.

In other alternative embodiments (not shown) box files are like box file 100 described above, except that either or both of the magnetic connectors between the top wall and the right wall, and between the right wall and the bottom wall (i.e. the two at the opposite end of the box file to the spine) are provided with modified male parts like male parts 127 and 128 described above, and with a first ferromagnetic body and/or a second ferromagnetic body mounted in the rear wall. The first body is disposed at a location magnetically coincident with the location of the external side of the male part of the magnetic connector between the top wall and the right wall when it is rotated a full 270 degrees on the associated freely rotating hinge from the connected position. Alternatively, or in addition to this, the second body is disposed at a location magnetically coincident with the location of the external side of the male part of the magnetic connector between the right wall and the bottom wall when it is rotated a full 270 degrees on the associated freely rotating hinge from the connected position. With these constructions, the top wall and/or the right wall and/or the bottom wall can be folded completely under the rear wall and then be held in place by the magnetic connection between the male parts in question and the associated first body and/or second body. This may be convenient if the box file is accessed directly for work and/or is to be moved in a fully open configuration.

In other alternative embodiments (not shown) box files comprise the same kind of magnetic connector arrangement with a male part like male parts 127 and 128 and first and/or second ferromagnetic bodies in the rear wall, located at the edge between the bottom wall and the left wall and between the left wall and the top wall. This is not to allow the left wall to be held in place under the rear wall, but to provide an additional connection for the top wall or the bottom wall to hold it in place under the rear wall adjacent to the left wall.

In other alternative embodiments (not shown) box files are like those described above, but instead of the magnetic connectors comprising male parts like male parts 127 and 128 described above, they comprise female parts of a likewise construction like those also described above, which are utilised to magnetically connect the top wall and/or the right wall and/or the bottom wall to the rear wall in the same way. It will be appreciated that a male part or a female part like this is used whichever would end up abutting against the rear wall in the fully folded back position, which will depend on which way around the magnetic connectors in question are disposed on the box file.

In yet further alternative embodiments (now shown) box files are like box file 100 described above, except that either or both of the magnetic connectors between the top wall and the right wall, and between the right wall and the bottom wall (i.e. the two at the opposite end of the box file to the spine) are provided with modified male parts like male parts 127 and 128 described above, a first ferromagnetic body and a second ferromagnetic body. This time both the first body and the second body are associated with one magnetic connector, and are intended to allow adjacent walls to both be held in place against the rear wall. Namely, the first body is mounted in the wall associated with the female part of the magnetic connector at a location at which when that wall is rotated a full 270 degrees on the associated freely rotating hinge from the connected position it is coincident with the location of the external side of the male part of the magnetic connector when it is rotated a full 270 degrees on its associated freely rotating hinge from the connected position. The second body is mounted in the rear wall at a location magnetically coincident with the location of the external side of the male part of the magnetic connector when it is rotated a full 270 degrees on the associated freely rotating hinge from the connected position. The result is that when the adjacent walls in question are both rotated round to positions under the rear side, a stack is created of the male part, the first body in the wall associated with the female part and the second body in the rear wall. As such, a magnetic connection is made between these three components which holds the two adjacent walls to one another, and then both to the rear wall.

In other alternative embodiments (not shown) box files are like those described above, but instead of the magnetic connectors comprising male parts like male parts 127 and 128 described above, they comprise female parts of a likewise construction like those also described above, which are utilised to magnetically connect the two adjacent walls to one another, and then to the rear wall. It will be appreciated that a male part or a female part like this is used whichever would end up abutting against the wall associated with the other of the male or female part, which will depend on which way around the magnetic connectors in question are disposed on the box file.

In yet further alternative embodiments (now shown) box files are like box file 100 described above, except that either or both of the magnetic connectors between the top wall and the right wall, and between the right wall and the bottom wall (i.e. the two at the opposite end of the box file to the spine) are provided with a modified male part like male parts 127 and 128 described above, a likewise modified female part with a fourth metal plate with a tail portion in line with the third metal plate in the second direction, a first ferromagnetic body, a second ferromagnetic body, a third ferromagnetic body and a fourth ferromagnetic body. The first body is mounted in the wall associated with the female part of the magnetic connector at a location at which when that wall is rotated a full 270 degrees on the associated freely rotating hinge from the connected position it is coincident with the location of the external side of the male part of the magnetic connector when it is rotated a full 270 degrees on its associated freely rotating hinge from the connected position. The second body is mounted in the rear wall at a location magnetically coincident with the location of the external side of the male part of the magnetic connector when it is rotated a full 270 degrees on the associated freely rotating hinge from the connected position. The third body is mounted in the wall associated with the male part of the magnetic connector at a location at which when that wall is rotated a full 270 degrees on the associated freely rotating hinge from the connected position it is coincident with the location of the external side of the female part of the magnetic connector when it is rotated a full 270 degrees on its associated freely rotating hinge from the connected position. The fourth body is mounted in the rear wall at a location magnetically coincident with the location of the external side of the male part of the magnetic connector when it is rotated a full 270 degrees on the associated freely rotating hinge from the connected position. The result of all this is that when the adjacent walls in question are both rotated round to positions under the rear side, two separate stacks are created. In the first there is the male part, the first body and then the second body, and in the second there is the female part, the third body and then the fourth body. As such, two sets of magnetic connections are made between the adjacent walls and the rear wall, which doubly holds the two adjacent walls to one another, and then both to the rear wall.

In other alternative embodiments (not shown) the protrusion and the slot are other co-operating shapes, such as a simple boss and socket.

In another alternative embodiment (not shown) the first magnet and the second magnet are arranged with their poles reversed so the first metal plate is at the south pole end of the first magnet and the second metal plate is at the north pole end, and so the third metal plate is at the north pole end of the second magnet and the fourth metal plate is at the south pole end.

In other alternative embodiments (not shown) a layer of paper, fabric or plastics material is overlaid over the first metal surface and the second metal surface. This is done for aesthetic purposes, and the additional layer is such that it does not interfere with the magnetic connection between the male part and the female part enough to prevent it working sufficiently well.

In other alternative embodiments (not shown) the first magnet and the second magnet are other thin, low-profile or flattened shapes including a cylinders, disks, triangular prisms, hexagonal prisms, cuboid and rectangular prisms.

Therefore, the present invention provides a magnetic connector in which the male part and the female part are releasably magnetically connected together at an angle. Further, the locating of the protrusion in the slot prevents any sheering movement between the first metal surface and the second metal surface. Such a connector can be used to connect any two items together at any angle, but it finds particular application in a box file. Furthermore, the present invention also provides a box file incorporating such magnetic connectors, which provide an advantageously strong connection between adjacent side walls thereof. Further enhancements of this concept are also provided, namely modified connectors to allow such a box file to be releasably connected to mounting strips, and to allow the walls of such a box file to be held in place under the rear wall for ease of use and transportation.

The invention claimed is:

1. A magnetic connector comprising a male part and a female part, in which said male part comprises a first side and a second side extending from said first side at an oblique angle thereto, in which said male part comprises a first metal portion comprising a first metal surface on said second side, in which said second side comprises a protrusion proud of said first metal surface, in which said female part comprises a third side and a fourth side extending from said third side at an oblique angle thereto, in which said female part comprises a second metal portion comprising a second metal surface on said fourth side, in which said fourth side comprises a slot for receiving said protrusion, in which at least one of said first metal portion and said second metal portion is magnetic and attracts the other.

2. A magnetic connector as claimed in claim 1 in which said first metal portion and said second metal portion are both magnetic and are attracted to one another.

3. A magnetic connector as claimed in claim 1 in which an internal angle between said first side and said second side is substantially 45 degrees, in which an internal angle between said third side and said fourth side is substantially 45 degrees, such that when said first metal surface and said second metal surface contact one another said first side and said third side are at substantially 90 degrees to one another.

4. A magnetic connector as claimed in claim 3 in which said second side has a rectangular shape with a greater length than width, in which said protrusion comprises an elongate wall extending in a lengthwise direction of said second side substantially equidistant from opposite lengthwise sides thereof and intersecting said first metal surface, in which said fourth side has a rectangular shape with a greater length than width, and in which said slot comprises an elongate trough extending in a lengthwise direction of said fourth side substantially equidistant from opposite lengthwise sides thereof and intersecting said second metal surface.

5. A magnetic connector as claimed in claim 4 in which said wall comprises a top surface at 45 degrees to said first metal surface, and in which said trough comprises a bottom surface at 45 degrees to said second metal surface.

6. A magnetic connector as claimed in claim 5 in which said first metal portion comprises a first magnet, a first ferromagnetic metal plate and a second ferromagnetic metal plate, in which said first magnet is tile-shaped and comprises a first face, a second face and a first edge surface, in which said first magnet comprises a north pole at said first face and a south pole at said second face, in which said first metal plate is magnetically connected to said first face and said second metal plate is magnetically connected to said second face, in which said first metal plate and said second metal plate are located with outer ends thereof proud of said first edge surface in a first direction, in which said outer ends of said first metal plate and said second metal plate combine to form said first metal surface, in which said second metal portion comprises a second magnet, a third ferromagnetic metal plate and a fourth ferromagnetic metal plate, in which said second magnet is tile-shaped and comprises a third face, a fourth face and a second edge surface, in which said second magnet comprises a south pole at said third face and a north pole at said fourth face, in which said third metal plate is magnetically connected to said third face and said fourth metal plate is magnetically connected to said fourth face, in which said third metal plate and said fourth metal plate are located with outer ends thereof proud of said second edge surface in a second direction, in which said outer ends of said third metal plate and said fourth metal plate combine to form said second metal surface.

7. A magnetic connector as claimed in claim 6 in which said wall protrudes beyond said outer ends of said first metal plate and said second metal plate and is made from a non-ferromagnetic material.

8. A magnetic connector a claimed in claim 7 in which said male part comprises a first frame comprising a first frame side, a second frame side parallel with said first frame side, a first outer side normal to said first frame side, and a first opening extending from said first frame side to said second frame side, in which said first magnet is disposed in said first opening, in which said first metal plate is disposed against said first frame side overlying said first opening, in which said second metal plate is disposed against said second frame side overlying said first opening, in which said first frame is shaped such that said first outer side protrudes beyond said first metal surface and forms said top surface of said wall, in which said female part comprises a second frame comprising a third frame side, a fourth frame side parallel with said third frame side, a second outer side normal to said third frame side, and a second opening extending from said third frame side to said fourth frame side, in which said second magnet is disposed in said second opening, in which said third metal plate is disposed against said third frame side overlying said second opening, in which said fourth metal plate is disposed against said fourth frame side overlying said second opening, in which said second frame is shaped such that said second outer side is shy of said second metal surface and forms said bottom surface of said trough.

9. A magnetic connector as claimed in claim 8 in which said first frame side comprises a first socket comprising a first inner wall and a first bottom wall, in which said first metal plate is disposed in said first socket with a first inner end thereof in contact with said first inner wall and a first underside thereof in contact with said first bottom wall, in which said second frame side comprises a second socket comprising a second inner wall and a second bottom wall, in which said second metal plate is disposed in said second socket with a second inner end thereof in contact with said second inner wall and a second underside thereof in contact with said second bottom wall, in which said third frame side comprises a third socket comprising a third inner wall and a third bottom wall, in which said third metal plate is disposed in said third socket with a third inner end thereof in contact with said third inner wall and a third underside thereof in contact with said third bottom wall, and in which said fourth frame side comprises a fourth socket comprising a fourth inner wall and a fourth bottom wall, in which said fourth metal plate is disposed in said fourth socket with a fourth inner end thereof in contact with said fourth inner wall and a fourth underside thereof in contact with said fourth bottom wall.

10. A magnetic connector as claimed in claim 9 in which said magnetic connector comprises a tri-part magnetic connector comprising said male part, said female part and a bracing part, in which said second metal plate comprises a first tab proud of a top side of said first frame, in which said fourth metal plate comprises a second tab proud of a top side of said second frame, in which said bracing part comprises a panel comprising a first panel socket for receiving said first tab, and a second panel socket for receiving said second tab.

11. A magnetic connector as claimed in claim 10 in which said bracing part is at least partially formed from a ferromagnetic metal.

12. A box comprising a front wall, a rear wall, a top wall, a bottom wall, a left wall and a right wall, in which freely rotating hinges are provided along edges of said box between said rear wall and each of said top wall, bottom wall, left wall and right wall, and in which a magnetic connector as claimed in claim 3 is provided at edges of said box between said bottom wall and said left wall, between said left wall and said top wall, between said top wall and said right wall and between said right wall and said bottom wall.

* * * * *